United States Patent
Hemphill et al.

(10) Patent No.: US 9,862,431 B1
(45) Date of Patent: Jan. 9, 2018

(54) TAILGATE CLAMP POCKET FOR PICKUP TRUCK

(71) Applicant: FORD GLOBAL TECHNOLOGIES, LLC, Dearborn, MI (US)

(72) Inventors: Joshua R. Hemphill, White Lake, MI (US); Dragan B. Stojkovic, Taylor, MI (US); Jack Marchlewski, Saline, MI (US); Robert Reiners, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/244,528

(22) Filed: Aug. 23, 2016

(51) Int. Cl.
*B62D 33/03* (2006.01)
*B62D 33/027* (2006.01)
*B62D 33/037* (2006.01)

(52) U.S. Cl.
CPC ......... *B62D 33/03* (2013.01); *B62D 33/0273* (2013.01); *B62D 33/037* (2013.01)

(58) Field of Classification Search
CPC .............. B62D 33/0207; B62D 33/023; B62D 33/0273; B62D 33/03; B62D 33/037
USPC ................................. 296/50, 51, 57.1, 183.1
See application file for complete search history.

(56) References Cited

U.S. PATENT DOCUMENTS

| 5,169,202 | A | * | 12/1992 | Cupp | B60P 1/435 269/900 |
| 5,433,566 | A |   | 7/1995  | Bradley | |
| 6,224,127 | B1 | * | 5/2001 | Hodge | B60P 3/14 182/150 |
| 6,616,388 | B1 |   | 9/2003 | Floe | |
| 7,905,532 | B2 | * | 3/2011 | Johnson | B60P 3/14 296/26.11 |
| 7,976,089 | B2 | * | 7/2011 | Jones | B60P 3/40 224/405 |
| 8,007,021 | B2 | * | 8/2011 | Pleet | B62D 33/0273 296/50 |
| 2004/0226974 | A1 |   | 11/2004 | Anton | |
| 2017/0203701 | A1 | * | 7/2017 | Stojkovic | B60R 11/00 |

FOREIGN PATENT DOCUMENTS

DE 19802225 A1 7/1999

* cited by examiner

*Primary Examiner* — Jason S Daniels
(74) *Attorney, Agent, or Firm* — Jason C. Rogers; Brooks Kushman P.C.

(57) ABSTRACT

A truck box assembly includes a truck box and a tailgate. The truck box is mounted to a vehicle body. The tailgate is mounted to a rear portion of the truck box for rotation between at least closed and open positions and includes an inner face and an upper face. The upper face defines a first clamp pocket sized to receive an external clamp to secure an item to the inner face when the tailgate is in the open position. The tailgate may further define a latch receiver pocket sized to receive a latch of the truck box to secure the tailgate in the closed position. The first clamp pocket may be located proximate the latch receiver pocket. The latch receiver pocket may be located adjacent a rear pillar of the truck box when the tailgate is in the closed position.

19 Claims, 4 Drawing Sheets

TAILGATE CLAMP POCKET FOR PICKUP TRUCK

TECHNICAL FIELD

This disclosure relates to pickup truck box assemblies including a tailgate component.

BACKGROUND

Pickup trucks are motor vehicles with a front passenger area, often referred to as a cab, and an open top rear cargo area, often referred to as a box. The box usually has a substantially flat bed from which two side body panels and a forward interconnecting header extend upwardly therefrom. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in many different ways, including carrying a variety of types of cargo, towing various types of trailers, and providing support to workers at a job site.

SUMMARY

A truck box assembly includes a truck box and a tailgate. The truck box is mounted to a vehicle body. The tailgate is mounted to a rear portion of the truck box for rotation between at least closed and open positions and includes an inner face and an upper face. The upper face defines a first clamp pocket sized to receive an external clamp to secure an item to the inner face when the tailgate is in the open position. The tailgate may further define a latch receiver pocket sized to receive a latch of the truck box to secure the tailgate in the closed position. The first clamp pocket may be located proximate the latch receiver pocket. The latch receiver pocket may be located adjacent a rear pillar of the truck box when the tailgate is in the closed position. The assembly may further include a work surface member defining a substantially flat surface and being removably mountable to the inner face of the tailgate. The tailgate may further include a handle for engaging and disengaging a latch system to secure the tailgate in the closed position. The upper face may further define a second clamp pocket. The first clamp pocket and the second clamp pocket may be defined at locations equidistant from the handle. The first clamp pocket may define a substantially cube-shaped cavity. The external clamp may be one of a C-clamp, an A-clamp, and a trigger clamp.

A tailgate for a pickup truck includes an inner surface and an upper surface. The inner surface faces a header of a truck box when the tailgate is in a closed position and defines an inner plane and a latch receiver pocket. The upper surface defines an upper plane perpendicular with the inner plane and a first clamp pocket proximate the latch receiver pocket. The first clamp pocket is sized to receive a clamp for securing an item to the inner surface of the tailgate. The latch receiver pocket may be sized to receive a latch of a truck box to secure the tailgate in the closed position. The first clamp pocket may be located proximate the latch receiver pocket. The tailgate may include a handle for engaging and disengaging a latch system. The upper surface may further define a second clamp pocket and the clamp pockets may be spaced equidistant from the handle. The tailgate may further include a latch receiver pocket located adjacent a rear pillar of the truck box when the tailgate is in the closed position. The tailgate may include a work surface member defining a substantially flat surface. The work surface member may be removably mountable to the inner surface of the tailgate. The tailgate may further include a cap sized for insertion within the first clamp pocket to prevent debris from entering the clamp pocket. A reinforcement member may be located at the first clamp pocket and secured to the tailgate to structurally reinforce the tailgate when the clamp is secured thereto.

A pickup truck box assembly includes a pickup truck box, a bed, a header, and a tailgate. The bed and header are mounted to the pickup truck box. The tailgate is mounted for rotation to the pickup truck box and defines a first clamp pocket on an upper surface sized to receive a portion of a clamp. The first clamp pocket may be oriented with an inner surface of the tailgate such that an item may be mounted to the inner surface when the tailgate is in an open position. The tailgate may further define a latch receiver pocket proximate the first clamp pocket. The first clamp pocket may define a cavity substantially cube-shaped. The tailgate may further include a handle for engaging the tailgate in a closed position and may further define a second clamp pocket. The clamp pockets may be spaced equidistant from the handle. A reinforcement member may be located at the first clamp pocket and secured to the tailgate to structurally reinforce the tailgate when the clamp is secured thereto.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
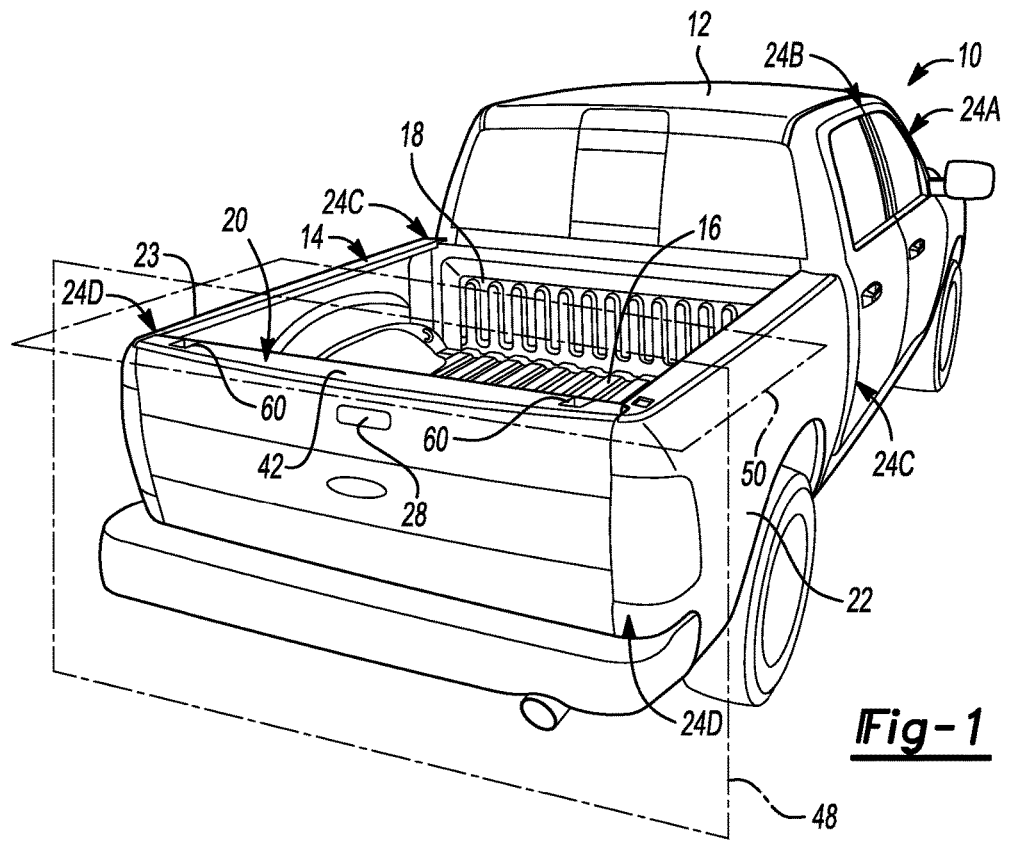
FIG. 1 is a rear perspective view of a vehicle.

FIG. 1 illustrates an example of a vehicle 10 that includes a cabin 12 and a truck box 14 supported by a vehicle chassis (not shown). The vehicle 10 may be, for example, a pickup truck. The truck box 14 includes a bed 16 having a forward end adjacent to the cabin 12 and a rear end opposite the forward end. The bed 16 supports a header 18 at the forward end and a tailgate 20 at the rear end. The bed 16 may also support a first body side panel 22 and a second body side panel 23. In this example, the vehicle 10 may include an a-pillar 24a, a b-pillar 24b, c-pillars 24c, and d-pillars 24d. The illustrated vehicle 10 is a four door configuration, however other configurations, such as a two door configuration may be adopted to incorporate the disclosed concepts. Alternate configurations may include different pillar references. The tailgate 20 is mounted to the bed 16 for rotation between at least an open position and a closed position. The tailgate 20 includes a handle 28 for engaging and disengaging a latch system (not shown) to secure the tailgate in the closed position.

Figure 2:
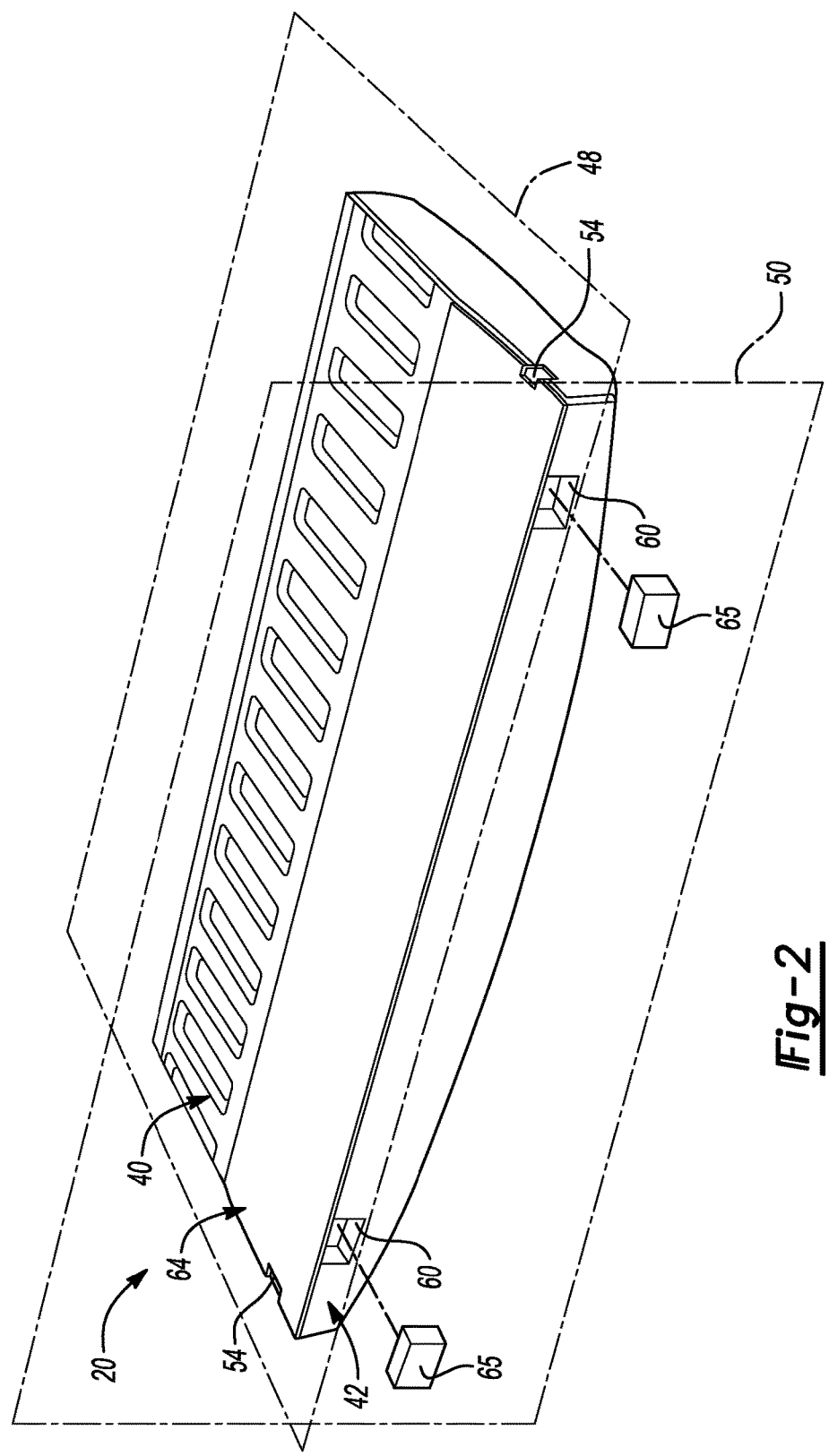
FIG. 2 is a fragmentary perspective view of a portion of a pickup truck box of the vehicle of FIG. 1.

Referring additionally to FIG. 2, the tailgate 20 includes an inner surface 40 and upper surface 42. The inner surface 40 faces the header 18 when the tailgate 20 is in the closed position and defines a first plane 48. The upper surface 42 defines a second plane 50. The first plane 48 is perpendicular to the second plane 50. The tailgate 20 defines a pair of latch receiver pockets 54.

Each of the latch receiver pockets 54 is sized to receive a latch (not shown) of the truck box 14 to secure the tailgate 20 in the closed position. Each of the latch receiver pockets 54 is located adjacent the respective d-pillar 24d when the tailgate 20 is in the closed position. The tailgate defines a pair of clamp pockets 60. The clamp pockets 60 are each defined at locations equidistant from the handle 28 and proximate the respective latch receiver pocket 54. Each of the clamp pockets 60 is sized to receive various types of clamps. For example, each of the clamp pockets 60 may define a substantially cube-shaped cavity sized to receive a portion of a clamp and such that the clamp is oriented for mounting a tool or piece of material to the tailgate 20 when in the open position. A work surface member 64 may be removably mounted to the inner surface 40. For example, the work surface member 64 may be substantially flat to provide a flat space for a user to work upon.

Each of a pair of caps 65 may be sized for insertion within the respective clamp pocket 60. Each of the caps 65 may assist in preventing debris from entering the respective clamp pocket 60 when not in use. For example, each of the caps 65 may seal the cavity of the respective clamp pocket 60. In one example, an outer surface of the cap 65 may be flush with the upper surface 42 of the tailgate 20. In another example, the outer surface of the cap 65 may be sized to partially overlap the upper surface 42 of the tailgate 20.

Figure 3:
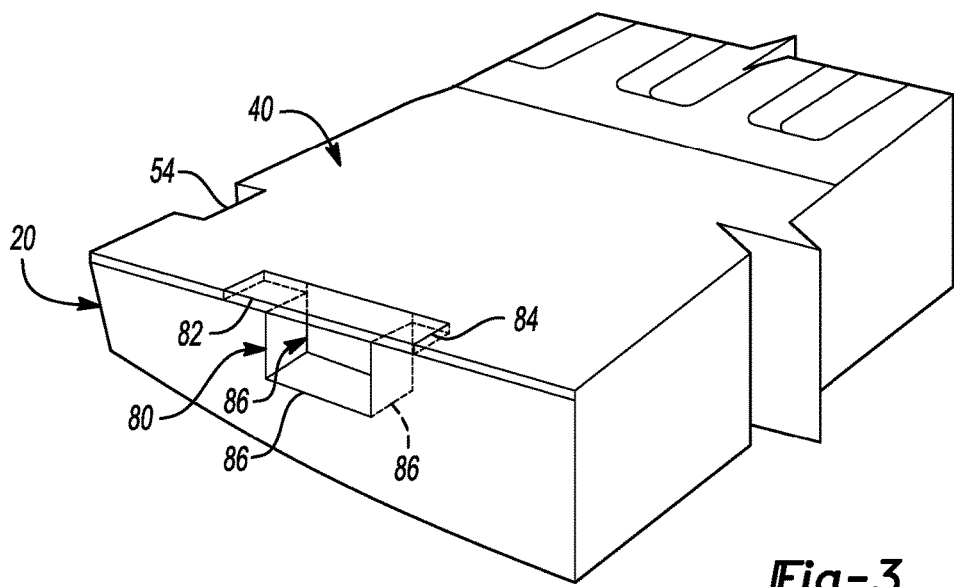
FIG. 3 is a fragmentary perspective view of a portion of a tailgate shown with an example of a reinforcement member.

FIG. 3 shows an example of a support structure for the clamp pockets 60. A reinforcement member 80 may be mounted to the tailgate 20 to provide structural reinforcement to a portion of the tailgate 20 near the respective clamp pocket 60. The reinforcement member 80 may include a first wing 82, a second wing 84, and sides 86. Each of the wings and the sides 86 may be secured to the tailgate 20. The reinforcement member 80 may be, for example, casted, molded, stamped, or extruded.

Figure 4:
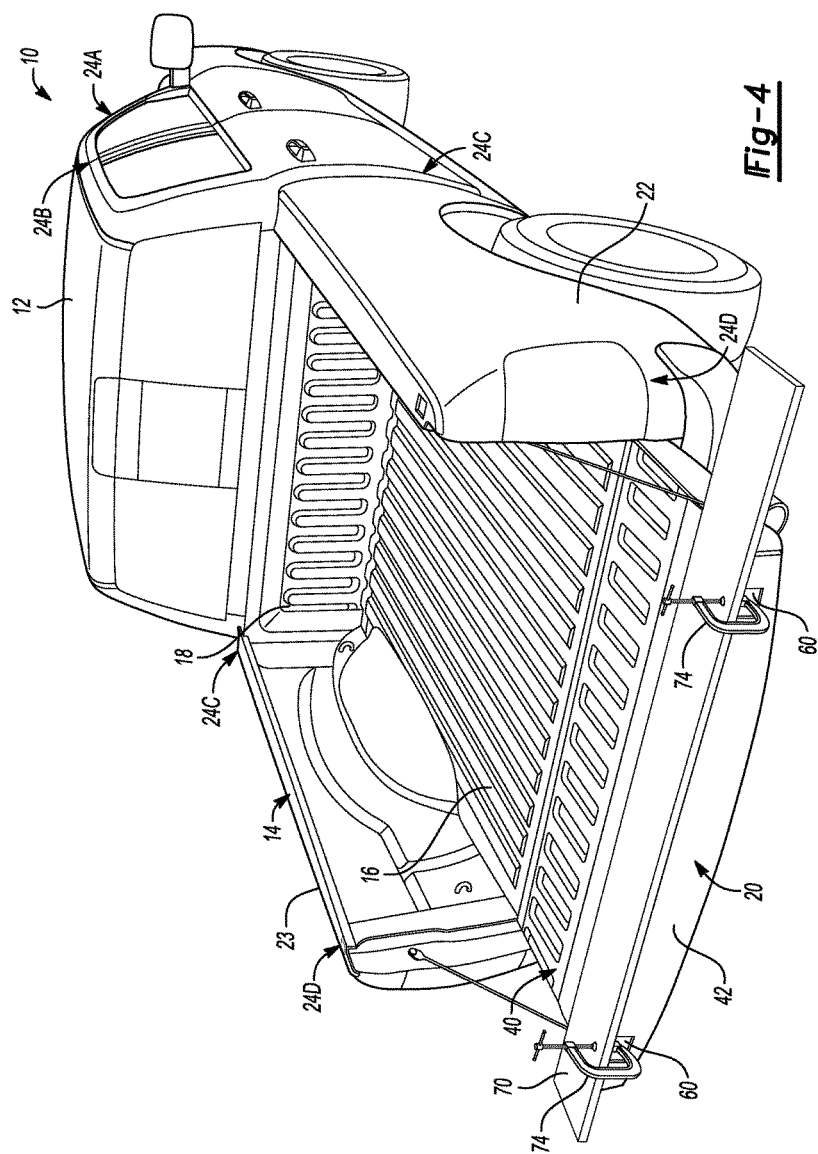
FIG. 4 is a fragmentary perspective view of the portion of the pickup truck box of FIG. 2 shown with an assembly mounted thereto.

FIG. 4 shows the tailgate 20 in the open position. A piece of material 70 may be mounted to the inner surface 40 of the tailgate 20. For example, a pair of clamps 74 may secure the piece of material 70 to the inner surface 40. A first portion of each clamp 74 may be disposed within the cavity of the respective clamp pocket 60 and a second portion of each clamp 74 may be positioned upon the piece of material 70. The piece of material 70 may be a board, plank or other similar work piece. It is contemplated that a tool may also be mounted to the inner surface 40 of the tailgate 20 via the clamp pocket 60 and clamp 74. Each of the clamps 74 utilizes the respective clamp pocket 60 to provide a region to grip the tailgate 20.

Figure 5A:
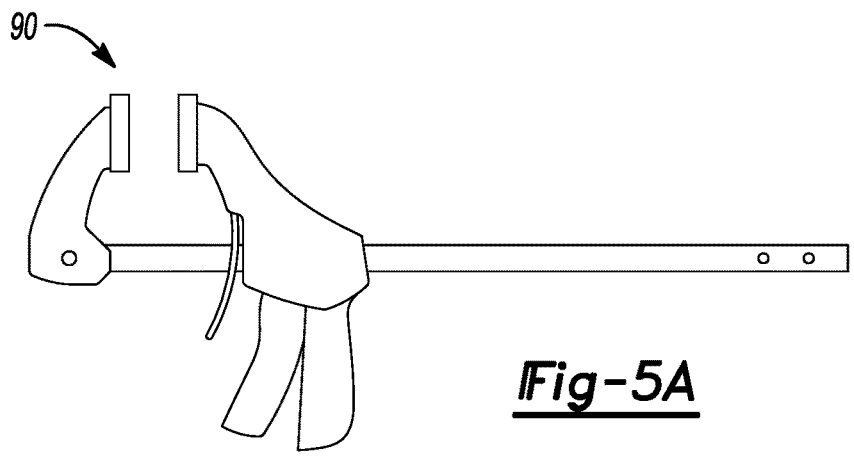
FIG. 5A is a side view of an example of a clamp.
Figure 5B:
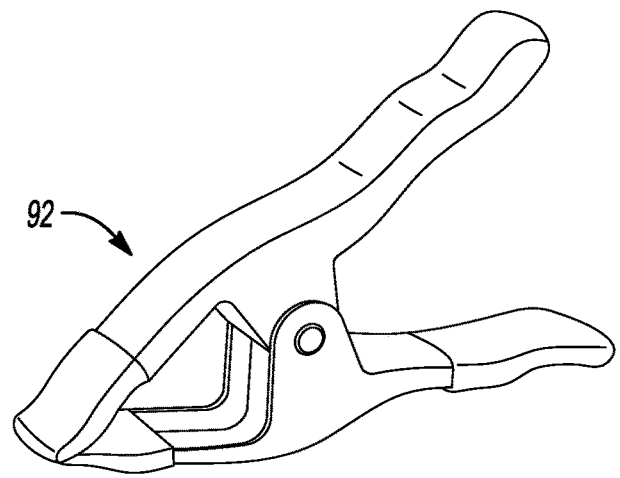
FIG. 5B is a perspective view of another example of a clamp.
Figure 5C:
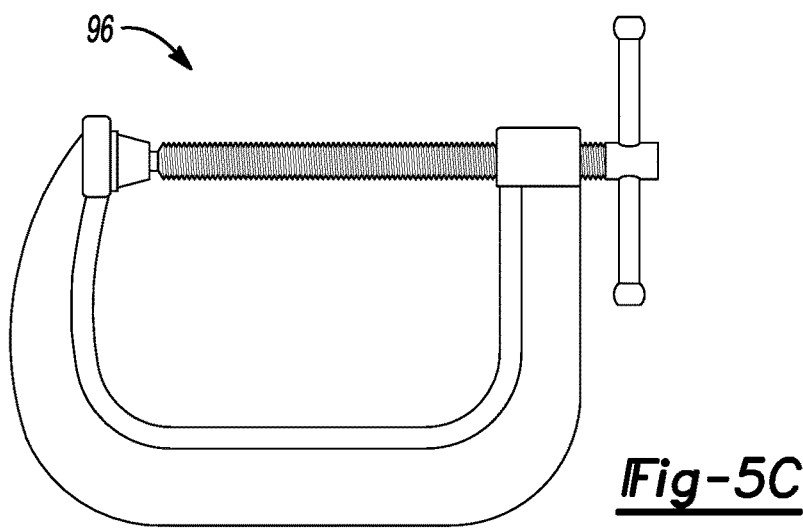
FIG. 5C is a side view of yet another example of a clamp.

Each of the clamp pockets 60 may be sized to receive various types of clamps. FIGS. 5A through 5C show examples of clamps though it is contemplated that other types of clamps may operate with the clamp pockets 60 to secure material to the inner surface 40 of the tailgate 20. FIG. 5A shows a trigger clamp 90. FIG. 5B shows an A-clamp 92. FIG. 5C shows an example of a C-clamp 96.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A truck box assembly comprising:
   a truck box for mounting to a vehicle body; and
   a tailgate mounted to a rear portion of the truck box for rotation between at least closed and open positions and including an inner face, and an upper face defining a first clamp pocket sized to receive an external clamp to secure an item to the inner face when the tailgate is in the open position.

2. The assembly of claim 1, wherein the tailgate further defines a latch receiver pocket sized to receive a latch of the truck box to secure the tailgate in the closed position, and wherein the first clamp pocket is located proximate the latch receiver pocket.

3. The assembly of claim 2, wherein the latch receiver pocket is adjacent a rear pillar of the truck box when the tailgate is in the closed position.

4. The assembly of claim 1 further comprising a work surface member defining a substantially flat surface and being removably mountable to the inner face of the tailgate.

5. The assembly of claim 1, wherein the tailgate further includes a handle for engaging and disengaging a latch system to secure the tailgate in the closed position, and wherein the upper face further defines a second clamp pocket, and wherein the first clamp pocket and the second clamp pocket are defined at locations equidistant from the handle.

6. The assembly of claim 1, wherein the first clamp pocket defines a substantially cube-shaped cavity.

7. The assembly of claim 1, wherein the external clamp is one of a C-clamp, an A-clamp, and a trigger clamp.

8. A tailgate for a pickup truck comprising:
an inner surface facing a header of a truck box when the tailgate is in a closed position and defining an inner plane and a latch receiver pocket; and
an upper surface defining an upper plane perpendicular with the inner plane and a first clamp pocket proximate the latch receiver pocket,
wherein the first clamp pocket is sized to receive a clamp for securing an item to the inner surface of the tailgate.

9. The tailgate of claim 8, wherein the latch receiver pocket is sized to receive a latch of the truck box to secure the tailgate in the closed position, and wherein the first clamp pocket is located proximate the latch receiver pocket.

10. The tailgate of claim 8 further comprising a handle for engaging and disengaging a latch system, wherein the upper surface further defines a second clamp pocket, and wherein the clamp pockets are spaced equidistant from the handle.

11. The tailgate of claim 8 further comprising a latch receiver pocket located adjacent a rear pillar of the truck box when the tailgate is in the closed position.

12. The tailgate of claim 8 further comprising a work surface member defining a substantially flat surface and being removably mountable to the inner surface of the tailgate.

13. The tailgate of claim 8 further comprising a cap sized for insertion within the first clamp pocket to prevent debris from entering therein.

14. The tailgate of claim 8 further comprising a reinforcement member located at the first clamp pocket and secured to the tailgate to structurally reinforce the tailgate when the clamp is secured thereto.

15. A pickup truck box assembly comprising:
a pickup truck box;
a bed mounted to the pickup truck box;
a header mounted to the pickup truck box; and
a tailgate mounted for rotation to the pickup truck box and defining a substantially cube-shaped first clamp pocket on an upper surface sized to receive a portion of a clamp.

16. The assembly of claim 15, wherein the first clamp pocket is oriented with an inner surface of the tailgate such that an item may be mounted to the inner surface when the tailgate is in an open position.

17. The assembly of claim 15, wherein the tailgate further defines a latch receiver pocket proximate the first clamp pocket.

18. The assembly of claim 15, wherein the tailgate further comprises a handle for engaging the tailgate in a closed position and further defines a second clamp pocket, and wherein the clamp pockets are spaced equidistant from the handle.

19. The assembly of claim 15 further comprising a reinforcement member located at the first clamp pocket and secured to the tailgate to structurally reinforce the tailgate when the clamp is secured thereto.

\* \* \* \* \*